US012728572B2

(12) United States Patent
Gutiérrez Moscardó et al.

(10) Patent No.: US 12,728,572 B2
(45) Date of Patent: Sep. 8, 2026

(54) THERMOCOMPRESSION DEVICE FOR PRODUCING RECYCLABLE HONEYCOMB PLATES AND METHOD IMPLEMENTED USING SAME

(71) Applicant: ASOCIACION DE INVESTIGACION DE LA INDUSTRIA TEXTIL (AITEX), Alcoy (ES)

(72) Inventors: Óscar Gutiérrez Moscardó, Alcoy (ES); Eduardo Fages Santana, Alcoy (ES)

(73) Assignee: ASOCIACION DE INVESTIGACION DE LA INDUSTRIA TEXTIL (AITEX), Alcoy (ES)

( * ) Notice: Subject to any disclaimer, the term of this patent is extended or adjusted under 35 U.S.C. 154(b) by 238 days.

(21) Appl. No.: 18/722,781

(22) PCT Filed: Nov. 30, 2022

(86) PCT No.: PCT/ES2022/070775
§ 371 (c)(1),
(2) Date: Jun. 21, 2024

(87) PCT Pub. No.: WO2023/126553
PCT Pub. Date: Jul. 6, 2023

(65) Prior Publication Data

US 2025/0135691 A1 May 1, 2025

(30) Foreign Application Priority Data

Dec. 27, 2021 (ES) ............................... ES202131217

(51) Int. Cl.
*B29C 43/46* (2006.01)
*B29C 33/02* (2006.01)
(Continued)

(52) U.S. Cl.
CPC ............ *B29C 43/46* (2013.01); *B29C 33/026* (2013.01); *B29C 43/222* (2013.01); *B29C 43/52* (2013.01);
(Continued)

(58) Field of Classification Search
CPC ..... B29C 43/46; B29C 33/026; B29C 43/222; B29C 43/52; B29C 2043/467;
(Continued)

(56) References Cited

U.S. PATENT DOCUMENTS 5,810,961 A * 9/1998 Andersen .................. B32B 9/00 264/282
7,514,025 B2 4/2009 Hofmann et al.
(Continued)

FOREIGN PATENT DOCUMENTS

EP 2460641 A1 6/2012
GB 2515559 A 12/2014
(Continued)

OTHER PUBLICATIONS

Mar. 10, 2023—International Search Report—Intl App PCT/ES2022/070775.

*Primary Examiner* — Inja Song
(74) *Attorney, Agent, or Firm* — Banner & Witcoff, Ltd.

(57) ABSTRACT

The invention relates to a thermocompression device for producing recyclable honeycomb plates with high mechanical strength, which, by means of the proposed configuration, enables high-speed production with an optimised operating width. For this purpose, the device comprises an area for continuously heating and pressing the supplied sheet, a cooling area, a calendering area and a moulding area. Advantageously, the moulding area comprises forming rollers provided with protuberances arranged in continuous rows distributed on the surface of the forming rollers, such
(Continued)

that the rows are arranged cross-wise with respect to the sheet supply direction. Recyclable honeycomb plates are thus obtained. The invention also relates to a method implemented using the described thermocompression device.

12 Claims, 4 Drawing Sheets

(51) Int. Cl.

| | |
|---|---|
| ***B29C 43/22*** | (2006.01) |
| ***B29C 43/52*** | (2006.01) |
| ***B29K 101/12*** | (2006.01) |
| ***B29K 105/08*** | (2006.01) |
| ***B29K 105/26*** | (2006.01) |
| ***B29L 7/00*** | (2006.01) |
| ***B29L 31/60*** | (2006.01) |

(52) U.S. Cl.
CPC .... *B29C 2043/467* (2013.01); *B29K 2101/12* (2013.01); *B29K 2105/0854* (2013.01); *B29K 2105/26* (2013.01); *B29K 2995/0094* (2013.01); *B29L 2007/002* (2013.01); *B29L 2031/608* (2013.01)

(58) Field of Classification Search
CPC ....... B29C 43/24; B29C 43/48; B29C 70/504; B29C 70/16; B29C 2043/461; B29C 53/285; B29C 70/224; B29C 65/48; B29C 2043/464; B29K 2101/12; B29K 2105/0854; B29K 2105/26; B29K 2995/0094; B29K 2023/06; B29K 2067/003; B29K 2077/10; B29K 2277/10; B29K 2307/04; B29K 2309/08; B29K 2105/206; B29L 2007/002; B29L 2031/608; B29D 24/005; B29D 99/0089
See application file for complete search history.

(56) References Cited

U.S. PATENT DOCUMENTS

| | | | | |
|---|---|---|---|---|
| 2006/0186233 | A1 | 8/2006 | Holm et al. | |
| 2008/0093766 | A1* | 4/2008 | Borazghi | B32B 3/12 264/120 |
| 2014/0087127 | A1* | 3/2014 | Brinkhaus | B29C 66/83513 428/116 |
| 2022/0001643 | A1* | 1/2022 | Zhu | B32B 27/08 |

FOREIGN PATENT DOCUMENTS

| | | | |
|---|---|---|---|
| JP | H08-25534 | A | 1/1996 |
| JP | 2019-123885 | A | 7/2019 |
| WO | 2005-002817 | A1 | 1/2005 |

* cited by examiner

THERMOCOMPRESSION DEVICE FOR PRODUCING RECYCLABLE HONEYCOMB PLATES AND METHOD IMPLEMENTED USING SAME

CROSS REFERENCE TO RELATED APPLICATIONS

This is a U.S. National Phase Application under 35 U.S.C. § 371 of International Application No. PCT/ES2022/070775, filed Nov. 30, 2022, which claims priority to Spanish Application No. P202131217, filed Dec. 27, 2021, which was published Under PCT Article 21(2), the entire contents of which are incorporated herein by reference.

OBJECT OF THE INVENTION

The present invention relates to an improved thermocompression device, as well as to a method for producing recyclable honeycomb plates with high mechanical strength which are produced at a high speed and with an optimised operating width.

In this way, the thermocompression device applies a continuous process by means of a plurality of pairs of heated and non-heated rollers and allows producing recyclable honeycomb plates with several types of cell opening sizes based on the use of different materials, such as carded non-woven fabrics produced with fibres of a different nature in combination with thermoplastic fibres and low-grammage fabrics, as well as hybrid fabrics in combination with thermoplastic films.

Advantageously, the improved thermocompression device allows increasing operating speed, as well as producing recyclable honeycomb plates that are homogenous across the entire surface thereof, which translates into improved mechanical strength.

BACKGROUND OF THE INVENTION

Honeycomb plates with a high mechanical performance are known in the prior art as a constructive solution. However, these plates with a high mechanical performance have a high cost. Alternatively, honeycomb plates with a lower economic cost which, in contrast, offer insufficient mechanical performance, are known.

Moreover, the known honeycomb plates are extremely difficult to recycle. In this sense, aluminium, glass, paper and polypropylene stand out among the materials commonly used for forming honeycomb plates.

The basic technologies existing in the honeycomb plate production industry are described briefly below.

- Paper honeycomb plate expansion technology: This technology basically consists of the application of adhesive strips for the adhesion of successive layers of thin paper or cardboard which is then expanded to form the hexagonal geometry. These honeycomb plates are limited in that they cannot be produced with large core thicknesses and small cell sizes.
- Plastic sheet extrusion technology: This system consists of the extrusion of a thin sheet of 100% thermoplastic polymer (mainly PP) which then passes, in semi-molten state, over vacuum rollers and protuberances with half-hexagon geometries for forming plates with said half-hexagon shape. These plates are then cut and bent continuously in a specific manner. This system is limited in terms of core thicknesses, densities, possible polymers to be used and cell sizes; furthermore, a low-grammage web is always needed on the two faces of the honeycomb for the production thereof.
- High-performance honeycomb plate expansion technology: This system requires operators who are highly skilled and experienced in the production process. In this technology, materials such as Nomex paper, Kevlar, low-grammage technical fabric of glass, quartz or carbon can be used. First, adhesive strips are applied for the adhesion of successive layers of the described materials and expansion is then performed to form the hexagonal geometry. These blocks are then immersed in resin tanks and oven cured; this impregnation and curing process can be repeated several times (up to 16 times according to service requirements). This technology is limited to the described materials and to specific, high-performance applications due to the high production cost.
- Aluminium honeycomb plate expansion: This system consists basically of the same adhesion and expansion process as the foregoing, but without the need for resin immersion and subsequent curing, since aluminium maintains the half-hexagon bluntness once expanded. This system is limited in the sense that it can only be used with aluminium sheets.

Based on what has been described in the preceding paragraphs, the commonly used production processes for the formation of honeycomb plates hinder the use of materials different from those commonly used, i.e., honeycomb plate production technologies are adapted to the materials listed above, so it is not possible to use non-woven fabrics composed of fibres of a different nature and thermoplastic fibres with the currently known devices for producing recyclable honeycomb plates.

Moreover, continuous thermocompression devices such as that disclosed in Spanish utility model ES1265289 belonging to the applicant of the present invention, intended for the production of honeycomb plates from recyclable sheets of carded non-woven fabrics and thermoplastic fibres, are known, wherein these devices comprise a plurality of heated thermocompression rollers provided with half-hexagon shaped protuberances.

In that sense, the thermocompression device of utility model ES1265289 defines a moulding area in which the temperature is lower than the melting temperature of the sheet, whereas the height of the protuberances increases gradually to generate the half-hexagon shape in the sheet. Next, there is defined an attachment area where the pairs of rollers have a temperature higher than the melting temperature of the sheet of recyclable material, and where the height of the protuberances of the pairs of rollers remains constant with respect to the maximum height of the final segment of the moulding area. In that sense, the thermoplastic fibres of the sheet are melted in the attachment area, subsequently moving to a cooling area where the pairs of rollers have a temperature lower than the temperature of the attachment area, and the height of the protuberances of the pairs of rollers remains constant with respect to the attachment area.

Therefore, melting of the thermoplastic fibres of the sheet occurs in this area, such that the non-woven fabric which initially has a textile appearance and behaviour now has a strength similar to that of a piece of hard cardboard or wood veneer.

However, devices with the configuration described above do not allow working at high speed, which translates into greater operating costs in industrial production, since they can operate at a maximum speed of 1 m/min and a maximum width of 15 cm. Another drawback associated with the thermocompression device described in utility model ES1265289 is that there is a risk of the material to be thermoformed clumping together during operation, which translates into a material in which the molten thermoplastic fibres are not homogenously distributed, so the resulting honeycomb plate offers a lower mechanical strength. These material blockages even lead to the need to stop production in order to clear the material blockage.

DESCRIPTION OF THE INVENTION

The proposed device enables the production of recyclable honeycomb plates using sheets of recyclable material, in addition to other known sheets.

The sheets of recyclable material are preferably made up of non-woven fabrics composed of fibres of a different nature, low-grammage fabrics or fabrics of filament yarns in combination with a thermoplastic material, which can be in the form of fibres or thermoplastic film.

In the case of the sheet made up of non-woven fabrics, preferably, the non-woven fabric represents between 20% and 50% by weight of the composition of the sheet, whereas the thermoplastic material, in the form of fibres, represents between 50 and 80% by weight of the composition of the sheet fed to the device.

Preferably, the fibres making up the non-woven fabric of the sheet have lengths between 30 and 70 mm, which confers high mechanical strength to the produced recyclable honeycomb plate.

Advantageously, the use of non-woven fabrics, preferably produced by means of carding and air-laid technology (technology which uses air instead of water), allows the combination of fibres of a different nature such as, for example:

- Natural fibres, such as linen, cotton, hemp, bamboo fibres, among others.
- Recycled fibres, such as recycled carbon fibres, recycled aramid fibres, various textile fibres, among others. The use of recycled fibres results in the proposed device being ecological.
- Fire-proof technical fibres, such as aramid fibres, Pyrotex® fibres, Kynol® fibres, among others; and high mechanical strength fibres, such as carbon fibres, aramid fibres or glass fibres, among others.

Moreover, when the sheet has a non-woven fabric, the thermoplastic material which is used in combination with same is made up of thermoplastic fibres of polypropylene (hereinafter PP), polyethylene (hereinafter PE), polyester (PET), polyamide (PA), polylactic acid (PLA), polyester/polyethylene or high-density polyethylene bicomponent fibres, among others. Thermoplastic fibres allow the attachment of the different fibres making up the sheets fed to the device, by means of the application of temperature and pressure for the formation of honeycomb plates with a hexagonal geometry.

It should be noted that unlike the known devices, the device of the present invention allows the use of sheets made up of a low-grammage fabric (preferably between 40 and 150 g/$m^2$).

In this case, the thermoplastic material of the sheet is in the form of a thermoplastic film (with a preferred grammage of between 20 and 75 g/$m^2$), which is applied on both faces of the low-grammage fabric, generating the sheet which is fed to the thermocompression device proposed in the present invention.

In this sense, the thermocompression device of the present invention allows producing recyclable honeycomb plates, for this purpose sheets of recyclable material including a fabric and a thermoplastic material are fed to the mentioned device.

The thermocompression device of the invention has the following areas:

- an area for continuously heating and pressing the sheet having at least a first infrared radiation heating element and thermocompression rollers, wherein the temperature of the area for continuously heating and pressing is equal to or higher than the melting temperature of the thermoplastic material of the sheet,
- a cooling area for cooling the sheet having a water-chilled cooling element,
- a calendering area for calendering the sheet having at least a second infrared radiation heating element at a temperature equal to or higher than the melting temperature of the thermoplastic material of the sheet,
- a moulding area where the forming rollers are arranged at a temperature lower than the temperature of the calendering area.

In this way, the thermocompression rollers and the forming rollers are arranged in pairs, whereas the forming rollers have protuberances with a half-hexagon geometric shape. Therefore, the mentioned protuberances are arranged in continuous rows distributed on the surface of the forming rollers, such that the rows are arranged cross-wise with respect to the sheet supply direction in the thermocompression device.

Advantageously, the novel configuration of the proposed device likewise allows the use of fabrics of filament yarns in combination with thermoplastic fibres to make the sheet which is fed to the device.

The improved thermocompression device of the invention has a novel configuration which allows increasing the speed of supplying the sheet to the mentioned device to at least 4 m/min. In other words, a production of recyclable honeycomb plates of at least 4 m/min is achieved, making it ideal for industrial production.

Moreover, the production method of the present invention enables producing a new generation of recyclable honeycomb plates with optimised mechanical performance having a highly competitive quality/price ratio. These new cores with a honeycomb or hexagonal geometry differ from commercial ones, particularly, in one of the base materials that can be used for their production, such as non-woven fabrics (composed of reinforcement fibres and thermoplastic fibres). The use of non-woven fabrics (carded or air-laid) represents a novelty in this sector, since none of the current core production technologies allows such non-woven fabric format.

Therefore, the use of non-woven webs as a base enables reducing the cost of the end product and also provides the possibility of using very different reinforcement materials. This leads to the possibility of greater cost/performance optimisation compared to commercial honeycomb plates, since the composition of the core can be specifically adapted to the characteristics of the physicomechanical requirements of in-service application.

In this sense, the method for producing recyclable honeycomb plates of the invention, using the thermocompression device described in detail above, consists of the following steps:

- Continuously feeding a sheet including a fabric and a thermoplastic material to the area for continuously heating and pressing, for which the drive rollers are used.

Heating and pressing the sheet obtained in the preceding step at a temperature equal to or higher than the melting temperature of the thermoplastic material. For this purpose, the first heating element and the thermocompression rollers are used.

Feeding the sheet obtained in the preceding step to the cooling area by means of the drive rollers.

Cooling the sheet obtained in the preceding step by means of the water-chilled cooling element.

Feeding the sheet obtained in the preceding step to the calendering area by means of the drive rollers.

Calendering the sheet obtained in the preceding step by means of the application of heat and pressure with the second heating element at a temperature equal to or higher than the melting temperature of the thermoplastic material of the sheet.

Feeding the sheet obtained in the preceding step to the moulding area by means of the forming rollers.

Cooling and moulding the sheet obtained in the preceding step by means of the half-honeycomb hexagon shaped protuberances of the forming rollers to produce the recyclable plate.

BRIEF DESCRIPTION OF THE DRAWINGS

To complete the description that will be made below and for the purpose of helping to better understand the features of the invention, a set of drawings is attached as an integral part of said description in which the following is depicted in an illustrative and non-limiting manner.

PREFERRED EMBODIMENT OF THE INVENTION

FIGS. 3, 4, 5 and 6 show a preferred embodiment of the thermocompression device for producing recyclable honeycomb plates of the types supplied with sheets (4) of recyclable material including a fabric and a thermoplastic material.

Figure 4:
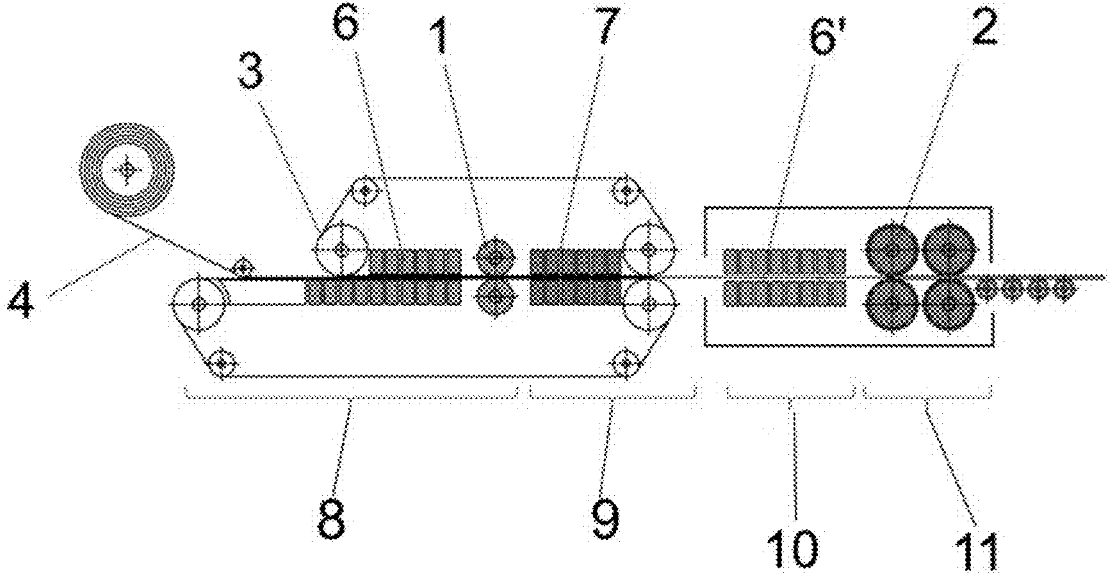
FIG. 4 shows a thermocompression device according to a preferred embodiment of the present invention.

In that sense, the proposed thermocompression device comprises a plurality of drive rollers (3), a plurality of heated thermocompression rollers (1) and a plurality of forming rollers (2) having protuberances (5) with a half-hexagon geometric shape; the thermocompression rollers (1) and the forming rollers (2) being arranged in pairs, as depicted in FIG. 4.

It should be indicated that the following areas are defined in the thermocompression device:

An area for continuously heating and pressing (8) the sheet (4) having a heating element made up of at least a first infrared radiation heating element (6) and thermocompression rollers (1), wherein the temperature of the area for continuously heating and pressing (8) is equal to or higher than the melting temperature of the thermoplastic material of the sheet (4).

Preferably, a pressure of at least 7 MPa is applied in the area for continuously heating and pressing (8). Advantageously, by melting the thermoplastic material with a pressure of at least 7 MPa, the sheet (4) is prevented from shrinking.

A cooling area (9) for cooling the sheet (4) having a water-chilled cooling element (7). Therefore, a sheet of smaller thickness with respect to the thickness of the sheet (4) fed to the area for heating (8) is achieved, and a homogenous distribution of the thermoplastic material across the entire extension of the sheet (4) of non-woven fabric is achieved. This homogenous distribution translates into a final plate with optimum mechanical strength.

A calendering area (10) for calendering the sheet (4) having a heating element made up of at least a second infrared radiation heating element (6') at a temperature equal to or higher than the melting temperature of the thermoplastic material of the sheet (4). The purpose of this step is to slightly melt the thermoplastic material of the sheet (4) again prior to the moulding thereof in order to produce the honeycomb plate.

A moulding area (11) where the forming rollers (2) are arranged at a temperature lower than the temperature of the calendering area (10). Preferably, a pressure of at least 7 MPa is applied in the moulding area (11), such that the forming rollers (2) with the half-hexagon shape cool the sheet (4), with the latter becoming a solid format and acquiring the honeycomb structure permanently. The protuberances (5) of each pair of forming rollers (2) are located offset with respect to one another in order to facilitate the thermocompression of the sheet (4).

Therefore, to produce a recyclable honeycomb plate using the improved thermocompression device of the present invention, the following method is followed:

Supplying a sheet (4) including a fabric and a thermoplastic material to the area for continuously heating and pressing (8) by means of the drive rollers (3).

Heating and pressing the sheet (4) at a temperature equal to or higher than the melting temperature of the thermoplastic material, by means of the first heating element (6) and the thermocompression rollers (1). Preferably, a pressure of at least 7 MPa is applied in the step of heating and pressing in the area for continuously heating and pressing (8).

Supplying the sheet (4) to the cooling area (9) by means of the drive rollers (3).

Cooling the sheet (4) by means of the cooling element (7).

Supplying the sheet (4) to the calendering area (10) by means of the drive rollers (3).

Calendering the sheet (4) by means of the application of heat and pressure with the second heating element (6') at a temperature equal to or higher than the melting temperature of the thermoplastic material of the sheet (4).

Supplying the sheet (4) to the moulding area (11) by means of the forming rollers (2).

Cooling and moulding the sheet (4) by means of the half-hexagon shaped protuberances (5) of the forming rollers (2) for producing the recyclable honeycomb plate. Preferably, a pressure of at least 7 MPa is applied in the step of cooling and moulding in the moulding area (11).

Once the honeycomb plates are produced, a step of gluing the plates is performed to generate the panel with a honeycomb structure. For this purpose, a process of gluing two plates by means of the deposition of an adhesive, a technology commonly known as “hot-melt lip”, is contemplated, obtaining cubic blocks of up to 1 $m^3$ in size by gradually combining pairs of plates. These blocks are then cut to the desired measurements.

Alternatively, the step of gluing two honeycomb plates is performed by means of a hot plate, which allows dispensing with additional adhesives, since the thermoplastic material itself present in the honeycomb plate allows the gluing of the plates upon being heated.

It should be noted that the incorporation of the area for continuously heating and pressing (8) and the cooling area (9) is of vital importance to increase the production speed with respect to the known devices, as well as to ensure the homogeneity of the honeycomb plate produced. This is due to the particular behaviour of non-woven fabrics when being subjected to specific temperatures that prevent the application of high production speeds in the known devices which lack the mentioned areas (8) and (9). In this way, a completely flat sheet is produced in the two first areas (8) and (9) and the desired area is then formed on said sheet in areas (10) and (11), so the combination of these four areas allows increasing production speed when sheets comprising a non-woven fabric and a thermoplastic material are used.

Figure 5:
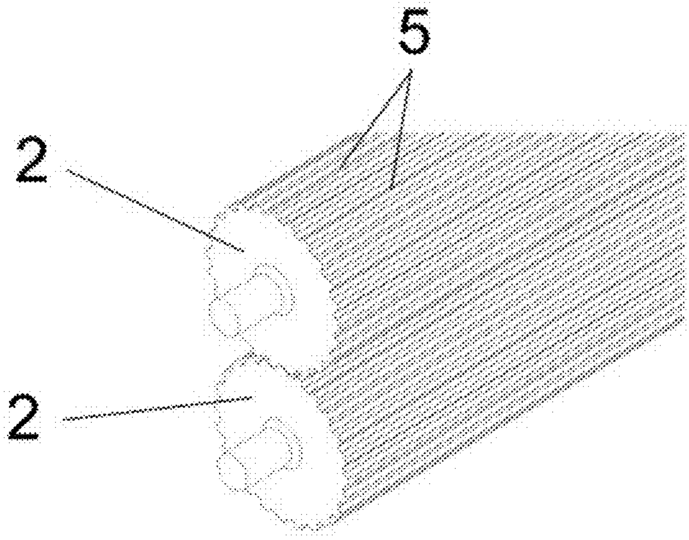
FIG. 5 shows a detail of a perspective view of forming rollers arranged in the moulding area of the thermocompression device depicted in the preceding figure.
Figure 6:
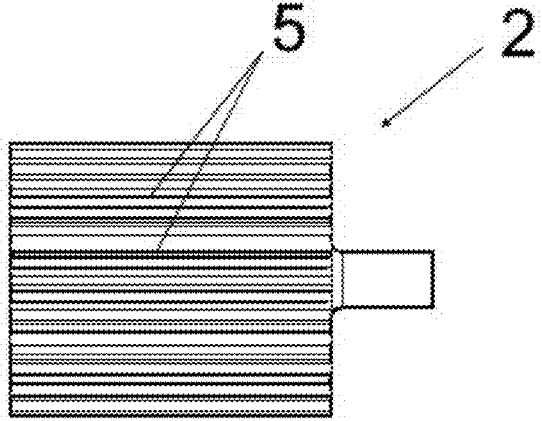
FIG. 6 shows a front view of the forming roller depicted in the preceding figure.

One of the novel aspects of the improved thermocompression device of the present invention lies in the arrangement of the protuberances (5) in the forming rollers (2). In this sense, as can be seen in FIGS. 5 and 6, the protuberances (5) of the forming rollers (2) are arranged in continuous rows distributed on the surface of the forming rollers (2), such that the rows are arranged cross-wise with respect to the sheet supply direction (4). This cross-wise arrangement likewise allows increasing production speed, ensuring homogeneity across the entire extension of the sheet (4) and making the best use of the surface thereof, since the entire width thereof is utilized.

Figure 1:
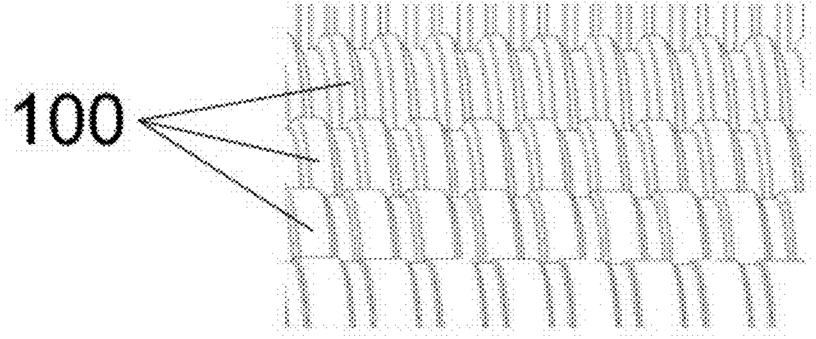
FIG. 1 shows a depiction of the thermocompression rollers making up a known thermocompression device.
Figure 2:
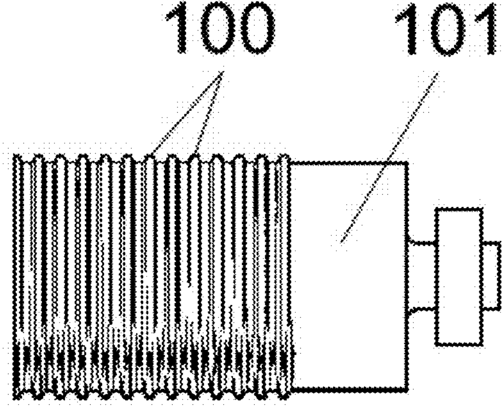
FIG. 2 shows a detailed front view of an example of thermocompression rollers which are part of a known thermocompression device.
Figure 3:
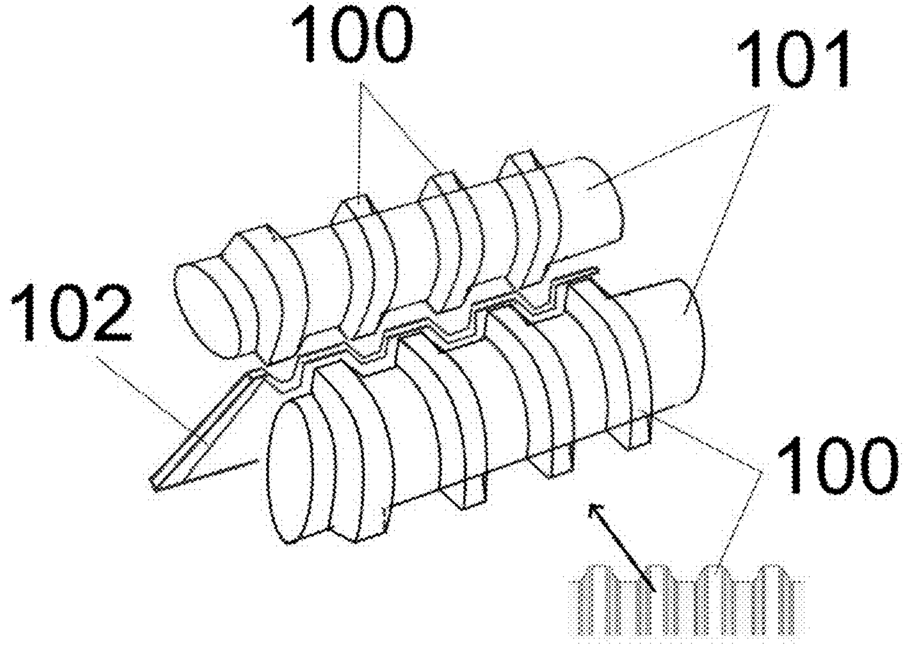
FIG. 3 shows the sheet obtained from two thermocompression rollers which are part of a known thermocompression device.

The novel arrangement of the protuberances (5) in the forming rollers (2) of the device of the present invention generates a very advantageous effect which could not be achieved with the rollers known (101) depicted in FIGS. 1, 2 and 3.

In this sense, it can be seen that in the known devices, the protuberances (100) of the forming rollers (101) are arranged length-wise with respect to the direction for supplying the sheet (102), as can be seen in FIG. 3.

The known devices are limited to both a maximum speed of 1 m/min (this speed is considered very slow) and a formation width of 15 cm (at the industrial level, this would be about 100-200 cm), where processing becomes extremely difficult at a higher production speed or greater formation width to the point where production is practically impossible.

However, in the improved thermocompression device of the present invention, the protuberances (5) are arranged cross-wise with respect to the direction for supplying the sheet, which translates into a method that is quicker, more efficient and more homogenous.

The thermocompression device of the invention proposed in the present application allows working with a speed of supplying the sheet (4) of recyclable material of at least 4 m/min.

Likewise, it should be indicated that the fabric of the sheet (4) is preferably a non-woven fabric, a low-grammage fabric with a grammage between 40 and 150 g/$m^2$, or a fabric with filament yarns, whereas the thermoplastic material of the sheet (4) is made up of thermoplastic fibres or a thermoplastic film with a grammage between 20 and 75 g/$m^2$.

Finally, it should be indicated that the honeycomb plate obtained in the moulding area (11), i.e., after the step of cooling and moulding the sheet (4), has a width between 100 and 200 cm, producing a homogenous recyclable honeycomb plate with optimised mechanical strength.

The invention claimed is:

1. A thermocompression device for producing recyclable honeycomb plates of the types supplied with sheets of recyclable material including a fabric and a thermoplastic material, the thermocompression device comprising: a plurality of drive rollers, a plurality of heated thermocompression rollers and a plurality of forming rollers having protuberances with a half-hexagon geometric shape; the thermocompression rollers and the forming rollers being arranged in pairs, and whereas the thermocompression device is defined by:
- an area for continuously heating and pressing the sheet, having at least a first infrared radiation heating element and the thermocompression rollers, wherein a temperature of the area for continuously heating and pressing is equal to or higher than the melting temperature of the thermoplastic material of the sheet,
- a cooling area for cooling the sheet, having a water-chilled cooling element,
- a calendering area for calendering the sheet, having at least a second infrared radiation heating element at a temperature equal to or higher than the melting temperature of the thermoplastic material of the sheet,
- a moulding area where the forming rollers are arranged at a temperature lower than the temperature of the calendering area,
- wherein the protuberances of the forming rollers are arranged in continuous rows distributed on an outer surface of each of the forming rollers, such that the rows are arranged cross-wise with respect to the direction for supplying the sheet.

2. The thermocompression device for producing recyclable honeycomb plates of the types supplied with sheets of recyclable material according to claim 1, further comprising in that a pressure of at least 7 MPa is applied in the area for continuously heating and pressing and in the moulding area.

3. The thermocompression device for producing recyclable honeycomb plates of the types supplied with sheets of recyclable material according to claim 1, further comprising in that a speed of supply the sheet of recyclable material is at least 4 m/min.

4. The thermocompression device for producing recyclable honeycomb plates of the types supplied with sheets of recyclable material according to claim 1, further comprising in that the fabric of the sheet is a non-woven fabric, a low-grammage fabric with a grammage between 40 and 150 g/$m^2$, or a fabric with filament yarns.

5. The thermocompression device for producing recyclable honeycomb plates of the types supplied with sheets of recyclable material according to claim 1, further comprising in that the thermoplastic material of the sheet is made up of thermoplastic fibres or a thermoplastic film with a grammage between 20 and 75 g/$m^2$.

6. The thermocompression device for producing recyclable honeycomb plates of the types supplied with sheets of recyclable material according to claim 1, further comprising in that the honeycomb plate obtained in the moulding area has a width between 100 and 200 cm.

7. A method for producing recyclable honeycomb plates according to the thermocompression device of claim 1 comprising:

supplying the sheet including the fabric and the thermoplastic material to the area for continuously heating and pressing by means of the drive rollers, heating and pressing the sheet at the temperature equal to or higher than the melting temperature of the thermoplastic material, by the first infrared radiation heating element and the thermocompression rollers, supplying the sheet to the cooling area by the drive rollers, cooling the sheet by means of the water-chilled cooling element, supplying the sheet to the calendering area by the drive rollers, calendering the sheet by applying heat and pressure with the second infrared radiation heating element at the temperature equal to or higher than the melting temperature of the thermoplastic material of the sheet, supplying the sheet to the moulding area by the forming rollers, cooling and moulding the sheet by the half-hexagon shaped protuberances the forming rollers for producing the recyclable honeycomb plate.

8. The method for producing recyclable honeycomb plates according to claim 7, further comprising in that the honeycomb plate obtained in the step of cooling and moulding the sheet has a width between 100 and 200 cm.

9. The method for producing recyclable honeycomb plates according to claim 7, further comprising in that the honeycomb plate obtained in the step of cooling and moulding the sheet is subjected to a step of gluing to another honeycomb plate by depositing an adhesive.

10. The method for producing recyclable honeycomb plates according to claim 7, further comprising in that the honeycomb plate obtained in the step of cooling and moulding the sheet is subjected to a step of gluing to another honeycomb plate by a hot plate.

11. The method for producing recyclable honeycomb plates according to claim 7, further comprising in that the pressure of at least 7 MPa is applied in the step of heating and pressing in the area for continuously heating and pressing and in the step of cooling and moulding in the moulding area.

12. The method for producing recyclable honeycomb plates according to claim 7, further comprising in that the speed of supplying the sheet to the thermocompression device is at least 4 m/min.

* * * * *